(12) United States Patent
Faith et al.

(10) Patent No.: US 7,819,321 B2
(45) Date of Patent: Oct. 26, 2010

(54) APPLIANCE FOR FINANCIAL TRANSACTION TOKENS

(75) Inventors: Patrick L. Faith, Pleasanton, CA (US); Ayman A. Hammad, Pleasanton, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 684 days.

(21) Appl. No.: 11/767,160

(22) Filed: Jun. 22, 2007

(65) Prior Publication Data

US 2008/0314994 A1 Dec. 25, 2008

(51) Int. Cl.
 *G06K 7/06* (2006.01)
(52) U.S. Cl. .................. 235/441; 235/451; 235/380; 235/492
(58) Field of Classification Search .................. 235/441, 235/451, 380, 492
 See application file for complete search history.

(56) References Cited

U.S. PATENT DOCUMENTS

| 2004/0129787 | A1* | 7/2004 | Saito et al. ................. 235/492 |
| 2005/0001711 | A1* | 1/2005 | Doughty et al. ............ 340/5.74 |
| 2005/0234778 | A1 | 10/2005 | Sperduti et al. |
| 2005/0269402 | A1 | 12/2005 | Spitzer et al. |
| 2007/0136211 | A1 | 6/2007 | Brown et al. |

OTHER PUBLICATIONS

Blythe, Phillip T., "Improving public transport ticketing through smart cards", In Proceedings of the Institution of Civil Engineers, paper 13610, p. 47-54, Published Dec. 15, 2003. [retrieved on Mar. 18, 2008]. Retrieved from the Internet: <URL: http://www.thomaste/ford.com/journals/DocumentLibrary/ME1570109.pdf>.

* cited by examiner

*Primary Examiner*—Edwyn Labaze
(74) *Attorney, Agent, or Firm*—Bradley K. DeSandro; Quarles & Brady LLP

(57) ABSTRACT

There is provided an accessory device for a financial transaction token. The accessory has an onboard power storage device that enables a financial token or card that is in communication with the accessory to operate when the card or token is not in the proximity of a merchant terminal (e.g.; a POS terminal). In one implementation, the onboard power storage device includes a rechargeable battery or capacitor such as a thin-film capacitor that stores sufficient energy to power the accessory's onboard electronics and/or the electronics of a financial token in communication with the accessory. The accessory may be a subcomponent of another consumer device such as a computing device, communications device, an item of clothing, an item of jewelry, a cell phone, a PDA, an identification card, a money holder, a wallet, a purse, a briefcase, or a personal organizer.

50 Claims, 7 Drawing Sheets

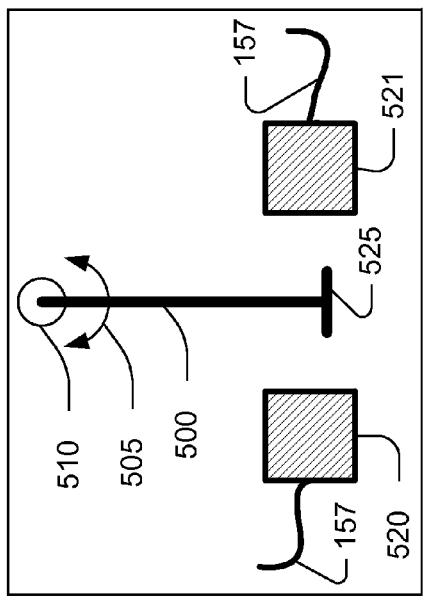
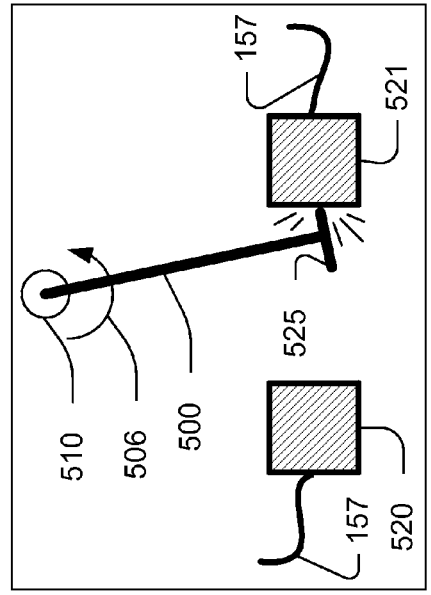

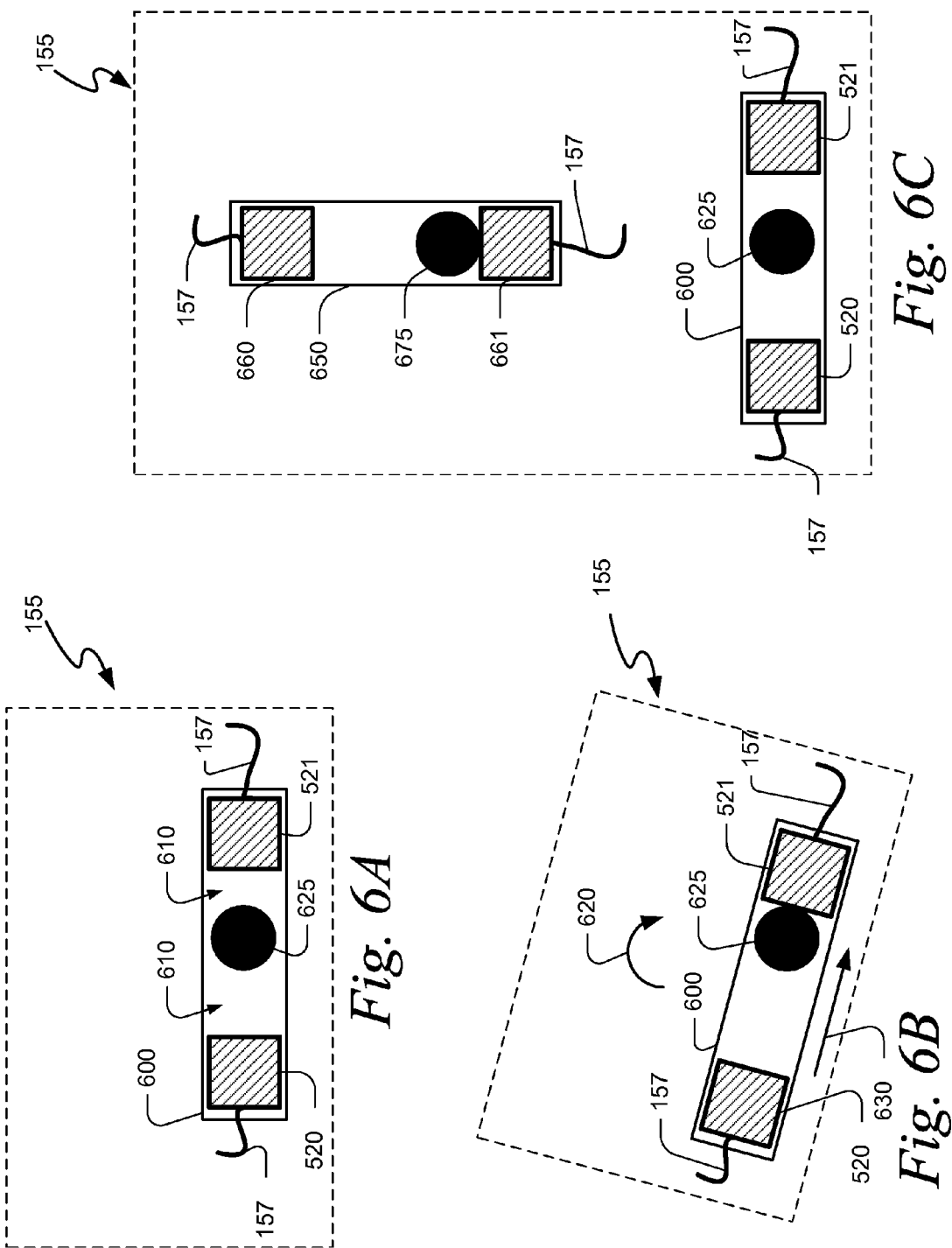

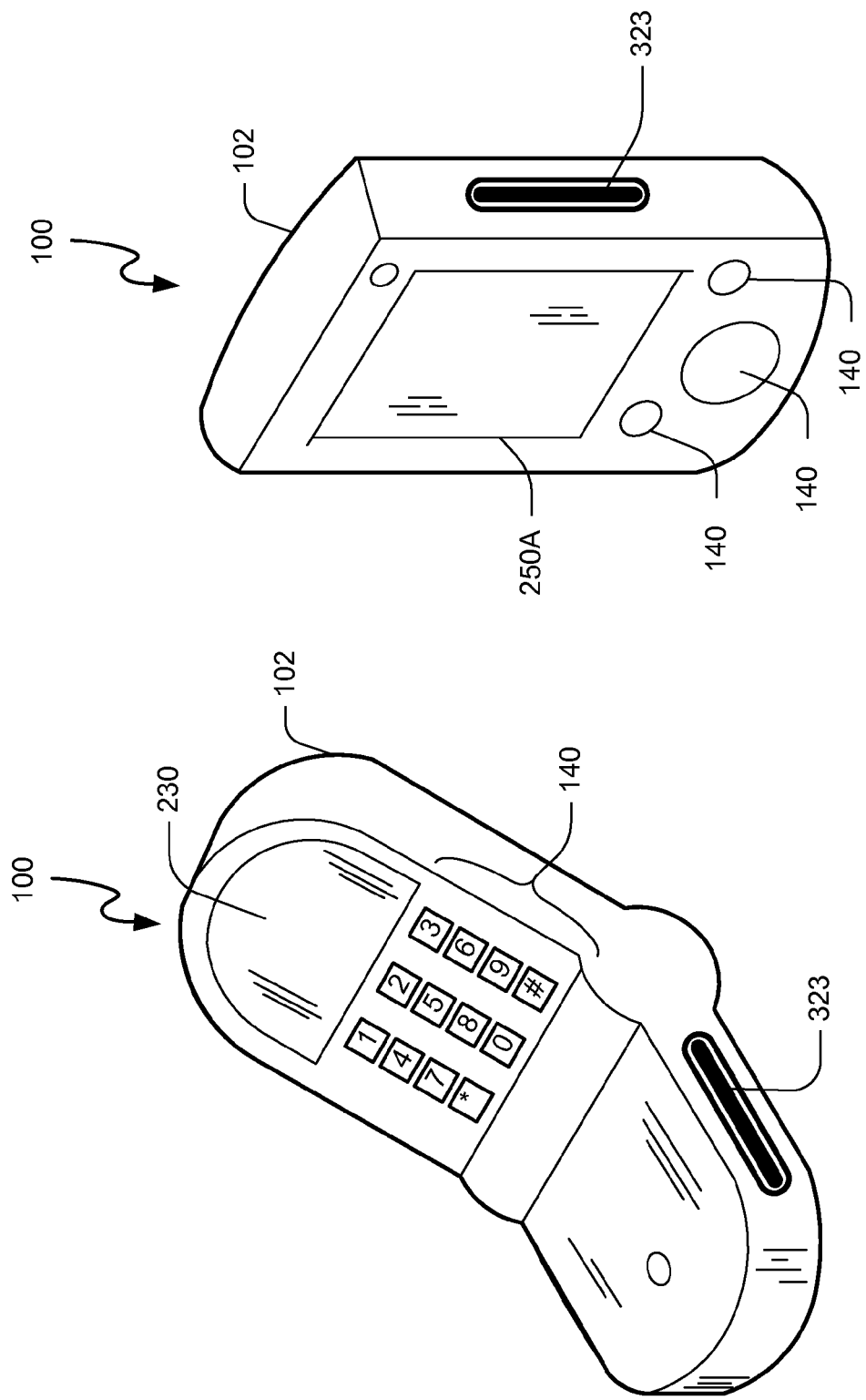

APPLIANCE FOR FINANCIAL TRANSACTION TOKENS

BACKGROUND

Increasingly, consumers have come to rely on debit, credit, and stored value cards as a preferred vehicle to provide payment for transactions. Credit cards provide ready access to funds, offer financial protection superior to cash or checks, support loyalty programs, and allow consumers to take advantage of purchasing opportunities when funds may not be otherwise available. As debit and stored value cards have become increasingly popular, the need for consumers to carry cash or checkbooks is still further reduced.

Within the past few years, card associations and issuers have been providing transaction cards that are enhanced with features beyond the typical embossed account number, expiration date, cardholder name, and signature area. "Smart cards," for example, have now come into popular use, and allow for enhanced security of both debit and credit cards by use of onboard integrated circuits to provide memory and optional microprocessor functionality. Smart cards and other enhanced or memory cards or tokens have found uses from replacements for simple embossed credit/debit cards, toll booth payment, ATM card replacements, and even Subscriber Identity Module (SIM) cards in cellular handsets.

Even though smart cards and electronics-enhanced cards have provided improvements over traditional credit cards, they suffer from a number of deficiencies. For example, electronics circuitry on enhanced financial transaction cards must receive externally-provided power to operate. To obtain power from a merchant's financial or Point-Of-Service (POS) terminal, contact-type smart cards use a physical connector interface; two of such interfaces are defined ISO standards 7810 and 7816. However, many types of cards not in physical contact with a POS terminal or other power source cannot operate, and therefore these cards are necessarily inactive at all other times. Alternatively, some enhanced financial transaction cards obtain power from a terminal-generated RF electromagnetic field by way of an inductor that is part of the card's circuitry. For example, ISO 14443 defines a popular contactless financial transaction card protocol. However, current contactless cards must be in close proximity to the properly modulated electromagnetic field in order to operate (10 cm in the case of ISO 14443-compliant cards). Due to the intentionally limited power and range of such short range fields, RF-powered cards cannot operate outside of the immediate area of a merchant's POS terminal, and may not have sufficient power in some cases to provide sophisticated electronic computations or support more power consuming circuitry such as displays. Further, embedded chips of some contactless smart cards often employ cryptographic security algorithms that can be "cracked" or decoded if the time and electrical current required for certain encryption or decryption operations is measured. Several demonstrations of this mode of account compromise have been documented, and thus, the possibility of surreptitious measurement of such parameters without knowledge of the cardholder presents a significant security risk.

What is needed then is an accessory device for a financial transaction card or token that provides power to the card or token to support operation of the card or token's features. What is further needed is an accessory for a financial transaction card or token that has an onboard power source that does not utilize the hazardous chemicals associated with typical power sources such as replaceable or rechargeable batteries. What is also needed is an accessory for a financial transaction card or token that has a power source that is rechargeable and has a form factor that may be easily carried in a pocket or purse. What is further needed is an accessory for a financial transaction token that can allow the token to operate in an environment significantly removed from a POS terminal. What is also needed is an accessory for a financial transaction token that utilizes an onboard power source to provide cryptographic security and protect the token when not in use. What is still further needed is a mobile accessory device that may reprogram a financial transaction card or token to encode a variety of types of account information, thereby allowing for payment flexibility using the financial transaction token. What is also needed is an accessory for a financial transaction token that allows the holder to view information stored in the token without being in proximity to a POS terminal. What is also needed is an accessory for a financial token transaction token that allows the holder to charge an energy storage device on the financial token and view the charge status of the financial tokens' energy source.

SUMMARY

There is provided an accessory device for a financial transaction token. The accessory has an onboard power storage device that enables a financial token or card that is in communication with the accessory to operate when the card or token is not in the proximity of a merchant terminal (e.g.; a POS terminal). In one implementation, the onboard power storage device includes a rechargeable battery or capacitor such as a thin-film capacitor that stores sufficient energy to power the accessory's onboard electronics and/or the electronics of a financial token in communication with the accessory. The accessory may be a subcomponent of another consumer device such as a computing device, communications device, an item of clothing, an item of jewelry, a cell phone, a PDA, an identification card, a money holder, a wallet, a purse, a briefcase, or a personal organizer.

In one implementation, the accessory includes a housing with a user interface, an integrated processor and storage, an onboard power source, and an interface to a financial token such as a smart card. The user interface optionally has an exposed region that is provided for encoding data including an account to pay for a transaction. The encoding renders data in several alternate or complementary formats, such as light- or laser-scannable bar coding on a display, electromagnetic signals that are transmitted to a merchant receiver, external contact pads for a contact-based pickup, and a magnetic stripe assembly. Using the exposed area, the accessory may complete a transaction with a merchant as a proxy for a financial token that is in communication with the accessory. In one implementation, a financial token that is in communication with the accessory may be reprogrammed by the accessory by accepting inputs from the accessory's user interface, and a the accessory's integrated processor transmits data to a processor embedded in the token, which in turn accepts the information and executes software in a processor located within the token to effect the reprogramming. This reprogrammable feature enables the holder of the accessory to secure the token by erasing a display or magnetic stripe or locking the token from unauthorized use. The accessory, when access is granted to a user, may perform calculations such as adding a tip from a predetermined tip percentage, or selecting payment to occur from a variety of different financial accounts. In one implementation, a magnetic stripe assembly in proximity to the token is reprogrammable, so that the token's embedded processor may select a particular account from input specified in the accessory's user interface, and provide instructions to reprogram the magnetic stripe. In another implementation, the accessory possesses read/write heads that are capable of reprogramming a financial token as the token is placed within or removed from a retaining cavity within the accessory's housing. The token's magnetic stripe may then be swiped through a conventional merchant magnetic stripe reader to initiate payment for a transaction. In yet another implementation, the account information or transaction authorization protocol stored within a financial token's memory is relayed to an accessory with which it is in communication, and a financial transaction is completed by the accessory in proxy for or in lieu of the token. In another implementation, the token also includes a memory that may optionally be maintained by the onboard power source located within the accessory.

In another implementation, an accessory for a financial token provides a charging current to an energy storage device located within the financial token. In this way, a relatively small capacity energy storage element can be recharged by placing the token in communication with the accessory, such as by sliding the token within a slot or cavity within the accessory device. An electrical interface may then proceed to charge the financial token's energy storage element through current provided by a power source in the accessory, or through relaying charging current that is obtained by the accessory's external charging interface. In another implementation, the accessory for a financial token possesses a charging circuit that can utilize an onboard energy generation capability to recharge the financial token's energy storage element and optionally recharge the power source within the accessory.

In another implementation, an accessory for a financial transaction card is provided that accepts and retains the card within a protective housing. The card may have a substantially rigid substrate not unlike conventional credit cards and an onboard energy storage device such as a thin-film capacitor. The card includes, in one implementation, a conventional or reprogrammable magnetic stripe assembly that is disposed proximal the substrate. As mentioned previously, the reprogrammable substrate may be configured by a an embedded processor that is commanded through inputs provided to an accessory device with which the card is in communication. In one implementation, the user provides input through a keyboard or an array of contact pads or blister buttons on or integrated into the accessory's housing Alternately, the user input section may include a biometric input device that scans fingerprints or other biometric data to authenticate the user of the accessory, or may have a pressure-sensitive area for inputting a predetermined access glyph such as by the user dragging a fingertip over a pad to reproduce a symbol that the user has previously identified. In one embodiment, the housing of the accessory retains and protects the card from unauthorized access, such as by preventing physical access to the card through a locking retaining mechanism, and/or by providing shielding against electromagnetic radiation including RF signals.

Various features and advantages of the invention can be more fully appreciated with reference to the detailed description and accompanying drawings that follow.

DESCRIPTION OF THE DRAWINGS

The features, objects, and advantages of embodiments of the disclosure will become more apparent from the detailed description set forth below when taken in conjunction with the drawings, in which like elements bear like reference numerals.

FIGS. 5A-5B show illustrations of a pendulum and piezoelectric crystal implementation of the charging circuit seen in FIG. 1;

FIGS. 6A-6C show illustrations of a movable mass and piezoelectric crystal implementations of the charging circuit seen in FIG. 1; and FIGS. 7A-7B illustrates two additional exemplary embodiments for the accessory for a financial transaction token.

DETAILED DESCRIPTION

Figure 1:
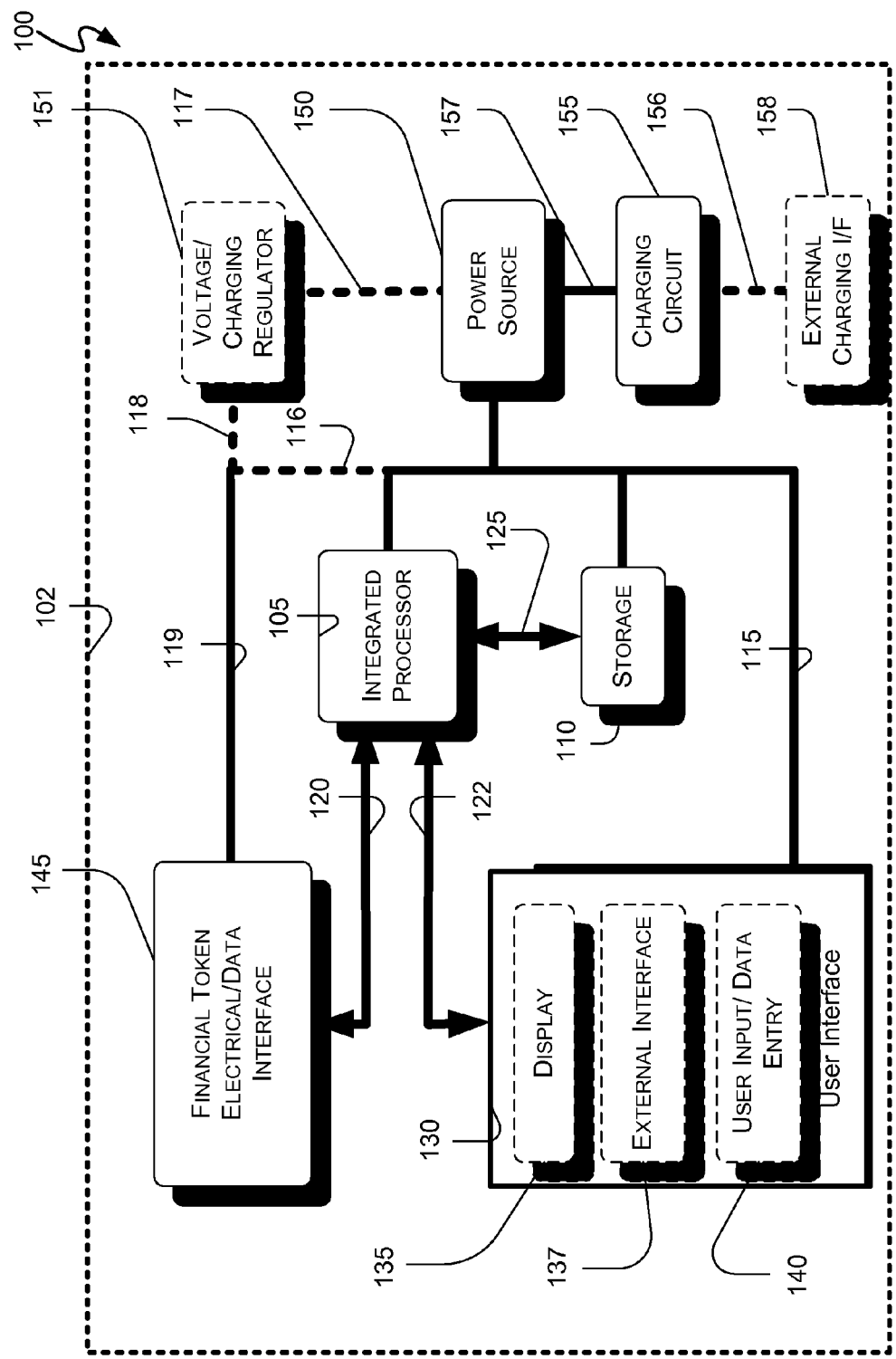
FIG. 1 depicts a block diagram of an exemplary implementation of an accessory for a financial transaction token including an electrical/data interface.

A block diagram for an exemplary implementation of an accessory 100 for a financial transaction token is seen FIG. 1. The accessory 100 comprises an assembly 102 that houses, supports, and/or integrates the components shown in FIG. 1. Those of skill in the relevant arts understand that the assembly 102 may be integrated within a consumer product such as a cell phone or PDA (with embodiments shown in FIGS. 7A and 7B, respectively), or may comprise a stand-alone assembly. The accessory includes an integrated processor 105, which those of skill in the relevant arts will appreciate may comprise a microprocessor chip, a microcontroller chip, an ASIC, a digital signal processor (DSP), or a smart card chip. The processor 105 is coupled to a power circuit 115. The power circuit 115 provides power to the accessory's electronic components 105, 110, and 130, and may further include signals indicating charging or connection status. The processor 105 is further coupled to signal busses 120, 122, and 125, which those of skill in the relevant arts will recognize may be comprised of a plurality of individual dedicated signal circuits, commonly shared signal busses, bidirectional signal circuits, unidirectional signal circuits, or combinations thereof. In one implementation, signal busses 120, 122, and 125 comprise a single commonly shared address/data bus with associated control signals. The integrated processor 105 is coupled to a storage 110 through signal bus 125. Those of skill in the relevant arts appreciate that the storage 110 may comprise any number of electronic, magnetic, or electromechanical storage devices such as miniature hard drives; SRAM memory; DRAM memory; ROM, PROM, EEPROM, or flash memory; or combinations thereof, and such storage may be included in total or in part upon the same integrated circuit substrate as the processor 105. The storage 110, if of volatile type, may have its data values preserved by power provided by the connected power circuit 115. Data stored in memory 110 may include code or program instructions which, when executed by processor 105, performs at least part of a command sequence requested by a user through the user interface 130.

An onboard power source 150 is coupled to and energizes the power circuit 115. Those of skill in the relevant arts will recognize that energy storage devices such as batteries, inductors, capacitors, or combinations thereof may be utilized to implement the power source 150. In one implementation, power source 150 comprises a thin film capacitor, and may utilize a single dielectric or a multilayer configuration alternating conducting layers and dielectric layers. A number of dielectrics such as polyester, polypropylene, polycarbonate, polystyrene, polyimide, PTFE, PET, and combinations thereof may be utilized in such thin film capacitor implementations. A substantially planar thin film capacitor implementation is beneficial for implementation in the instant accessory device 102, as the substantially planar form factor may be useful in minimizing the overall size of the accessory's footprint. In another implementation, power source 150 may be implemented with any number of conventional rechargeable and non-rechargeable batteries such as alkaline batteries, lithium ion batteries, nickel-cadmium batteries, and nickel metal hydride batteries.

The power source 150 also provides current to a power line 119 of a financial token interface 145 either directly through a connection 116 coupled to the power circuit 115, or via output 118 from a voltage regulator 151 which receives power from a coupling 117 to the power source. Those of skill in the relevant arts appreciate that the regulator 151 may be implemented with any number of conventional voltage regulators; for example, but not by way of limitation, such regulators may include alone or in combination: zener diodes, voltage regulator circuits, voltage translators, transformers, voltage dividers, switched power supplies, silicon controlled rectifiers, triacs, potentiometers, and the like.

The power source 150 is coupled 157 to a charging circuit 155. The charging circuit may also be coupled 156 to an external charging interface 158. Those of skill in the relevant arts will readily recognize that the charging interface 158 may be implemented with electrical contacts to an external circuit, or via an inductor for receiving power via electromagnetic radiation. In one implementation, charging circuit 155 includes one or more photovoltaic cells, coupled to the power source, which produce electricity upon exposure to light. In another implementation, charging circuit 155 further includes one or more piezoelectric crystals electrically connected, via coupling 157, to the power source 150, and a movable mass that strikes the piezoelectric crystals as the token 100 is moved. Turning to FIG. 5A, a piezoelectric charger implementation of the charging circuit 155 is shown. A movable pendulum mass 500 rotates 505, preferably in a substantially planar motion, about a pinned end 510. The pendulum mass 500 also has an impact end 525, that is disposed between and may strike either of two piezoelectric crystals 520, 521. As the crystals 520, 521 are electrically coupled 157 to the energy storage device 150, impacts of the pendulum mass 500 cause pulses of current to be delivered to the energy storage device 150 thus charging the storage device 150. FIG. 5B provides an illustration of the pendulum 500 moving 506 to strike crystal 521, and likewise, the pendulum mass 500 may move the opposite direction to strike the other crystal 520. Turning to FIG. 6A, an alternate mass/piezoelectric implementation of the charging circuit 155 is shown in cross section. A charger housing 600 constrains piezoelectric crystals 520, 521 from movement, and crystals 520, 521 are electrically coupled 157 to the power source 150. A movable mass 625 is disposed between the crystals 520, 521 within in the charger housing 600, and the mass is free to move within the spaces defined 610 by the charger housing 600 and the crystals 520, 521 as the appliance 100 is moved. Those of skill in the relevant arts understand that charger housing 600 may be implemented by many geometrical shapes that constrain the piezoelectric crystals 520, 521 while allowing mass 625 to move in the available space 610. For example, but not by way of limitation, charger housing 600 may be a cylindrical tube with mass 625 comprising a dense spherically-shaped object such as a metal ball bearing or a dense cylindrical metal slug. Similarly to FIGS. 5A-B, as the mass 625 strikes crystals 520, 521, pulses of current are produced and charge the power source 150. An example of the charging circuit of FIG. 6A is shown in action in FIG. 6B. When the accessory 102 containing charging circuit 155 is tilted 620 with respect to ground horizontal, the force of gravity propels mass 625 toward 630 one of the piezoelectric crystals 521, whereupon the mass 625 strikes the crystal 521 producing a current which is electrically coupled 157 to the power source 150. Turning to FIG. 6C, another implementation of a charging circuit 155 is shown with two crystal/mass housings 600, 650. In this illustration, housings 600, 650 have been laid out in the charging circuit 155 with central axes oriented orthogonally with respect to each other. Similarly to FIGS. 5A and 5B, a mass 675 is also movably disposed between two piezoelectric crystal elements 660, 661, that are coupled 157 to the power source 150, and the mass 675 is constrained by the housing 650. With this arrangement, rotation of the accessory 100 with respect to horizontal produces alternate mass/crystal strikes between the vertically disposed housing 650 and the horizontally disposed housing 600. Those of skill in the relevant arts appreciate that any number of crystal/mass/housing assemblies may be included in the charging circuit 155, and many possible geometric alignments are possible beyond disposal along orthogonal central axes. Those of skill in the relevant arts also appreciate that inertia of the mass 625, 675 may be used to cause striking forces as the charging circuit 155 is moved, independently from tilting the device. Therefore, movements such as walking or riding a vehicle may provide sufficient physical displacement to cause charging of the power source 150 to occur.

Returning to FIG. 1, a user interface 130 is also provided, and is coupled to the power circuit 115 and to the integrated processor 105 via signal bus 122. In one implementation, the user interface may include one or more conventional displays 135 that may output text, graphics, or a combination. The display 135 may be implemented in such formats as a liquid crystal display, a thin film transistor display, touch-sensitive screen, or organic LED display. The user interface 130 also includes an optional data entry apparatus 140. In one implementation, the data entry apparatus 140 may include an array of buttons labeled in a manner such as a QWERTY keyboard, a touch pad, a touch screen, or in a more simplistic implementation, a telephone touch pad with alphanumeric key assignments. In one implementation, the buttons in the data entry apparatus 140 may comprise blister buttons commonly known in the art. The user interface 130 may also include an optional on/off button that activates the accessory 100 for selecting desired account access, performing a calculation, or authenticating a user.

An external interface 137 is also provided. The external interface 137 enables the accessory 100 to communicate with external devices such as computer terminals, computer networks, or point of sale (POS) terminals. The interface 137 receives data and/or commands for displaying text or graphical information from bus 122, and receives power from power circuit 115. The interface 137 may also receive data from an outside source such as a wireless POS terminal, a financial institution, or a personal computer, and relays the data to the integrated processor 105 through data bus 122. Through user input to the data entry device 140, a variety of data may be provided to the external interface. In one implementation, the information provided to be output from the interface 137 may comprise health care information, personal identity information, biometric data, music, video data, or a combination thereof, and is considered interchangeable with the term "account data" used herein.

Figure 2:
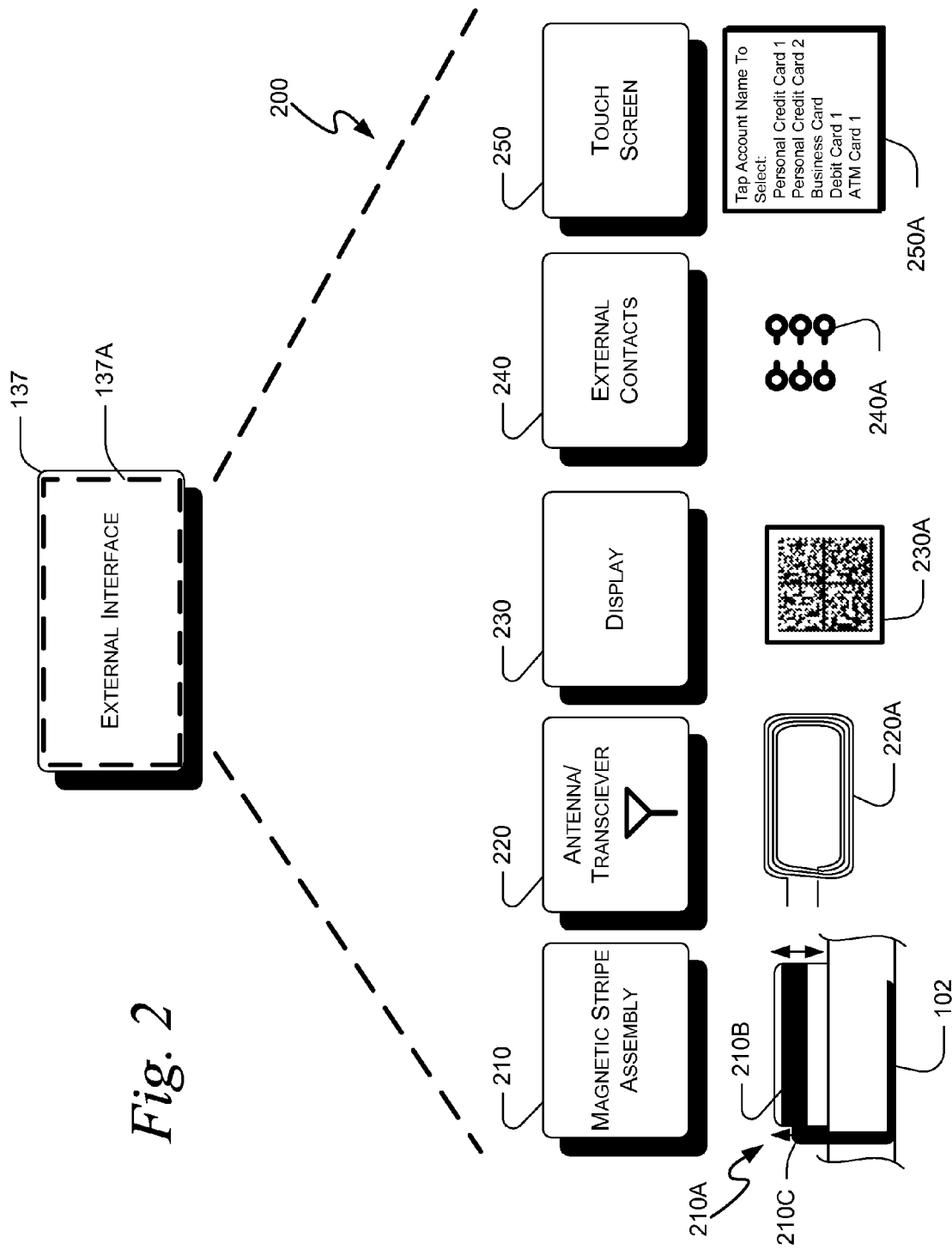
FIG. 2 illustrates possible alternate implementations of the electrical/data interface seen in FIG. 1.

Turning to FIG. 2, exemplary implementations 200 of the external interface 137 are shown. External interface 137 is depicted with an optional shielding element 137A, which allows desired electromagnetic, optical, or radiative signals to penetrate while protecting the external interface 137 from physical abuse or damage. The accessory 100 may optionally have areas outside of the external interface 137 shielded from physical abuse or otherwise acceptable forms of electromagnetic radiation. Some of the acceptable signals that are allowed to penetrate the shielding 137A may include, but are not limited to, signals accompanying a magnetic field, RFID signals, IrDA signals, visible light, invisible light, modulated laser, and/or modulated RF communication signals. By way of example and not by way of limitation, selective shielding element 137A may comprise a clear plastic shield, conformal coatings, an opaque plastic shield, or a clear thin film, depending on the implementation of external interface 137.

Non-limiting examples of the external interface are shown at reference numeral 200, and include a magnetic stripe assembly 210, an antenna and/or transceiver 220, a display screen 230, electrical contacts 240, and a touch screen 250. The magnetic stripe assembly 210 may comprise, in one implementation 210A, a reprogrammable magnetic stripe 210B that accepts data and/or commands from the processor 105 and formats and renders that data into a form on a magnetic stripe that is readable by conventional merchant magnetic stripe-reading POS terminals. In this manner, the processor 105 may program a particular account for use in a transaction as a function of user input selecting the account. Alternatively, the processor 105 may erase the magnetic stripe of the assembly 210, rendering the card useless in the event of its loss or theft. In the implementation shown 210A, the magnetic stripe assembly 210B at least partially slidably moves 210C into and out of the housing 102 of the accessory 100 (partial view shown), allowing the accessory 100 to conduct a financial transaction at a point of sale terminal that includes a magnetic stripe reader.

Continuing with FIG. 2, another implementation of the external interface 137 is shown as an antenna and/or transceiver 220. The antenna 220 may include commonly used loop inductors such as the one shown 220A, cellular phone antennae, WiFi antennae or in those shown in related ISO standards for RF-readable smart cards. With such an interface, account data may be translated, modulated and transmitted by the accessory in a manner acceptable by an RF contactless merchant Point-Of-Service (POS) terminal, a 802.11 WiFi or WiMax network, or by a cellular or RF communications network.

The external interface 137 may also be represented with a display screen 230. Account data may be rendered in the form of an optically-readable area, such as a one dimensional or two dimensional bar code 230A. In this manner, merchant POS terminals may optically scan the display area 230 with conventional laser scanners, and obtain account information without the need for expensive contactless RF POS terminals. As the display is electronically reconfigurable with information provided by the processor 105, the accessory 100 may represent any number of accounts for transaction payment based on the user's preference and input to the user interface 130. Also, as a security feature, the display may be blanked or filled with a decorative or entertaining graphic when the user has not provided an optional security access code, pad stroke, or pin number to the user interface 130.

External contacts 240 are yet another alternative implementation of the external interface 137 shown in FIG. 2. With the accessory 100 possessing physical contacts such as an array of conductive pads or shapes 240A, the accessory may be placed in physical contact with a merchant POS terminal, and the external contacts 240 may establish connectivity to the merchant's financial processing system. The integrated processor 105 may relay account-related information to the merchant POS terminal through the contact interface, thereby allowing the accessory 100 to be utilized with the large number of preexisting merchant POS terminals that accept smart cards. As with the other implementations 210, 220, 230, and 250 of the external interface 137, a combination of techniques may be utilized within the external interface to provide flexibility of use and ease of merchant access to account information.

Alternatively, the external interface 137 may comprise a touch screen 250, wherein text and/or graphics may be displayed, and user input may be accepted by touching selected areas of the screen. For example, but not by way of limitation, in an implementation shown at reference numeral 250A, a user is prompted to tap on one of a plurality of account descriptors, thereby selecting an account to complete a transaction. Those of skill in the relevant arts also appreciate that tapping the screen may be combined with using pointing devices such as a joystick, direction buttons, or selection wheels. In one embodiment, a user may provide authentication information by touching the display 250 in specified areas to indicate sequences of pin numbers, selected graphical elements, or drag strokes that match a predetermined access criterion stored within the storage 110.

Figure 3:
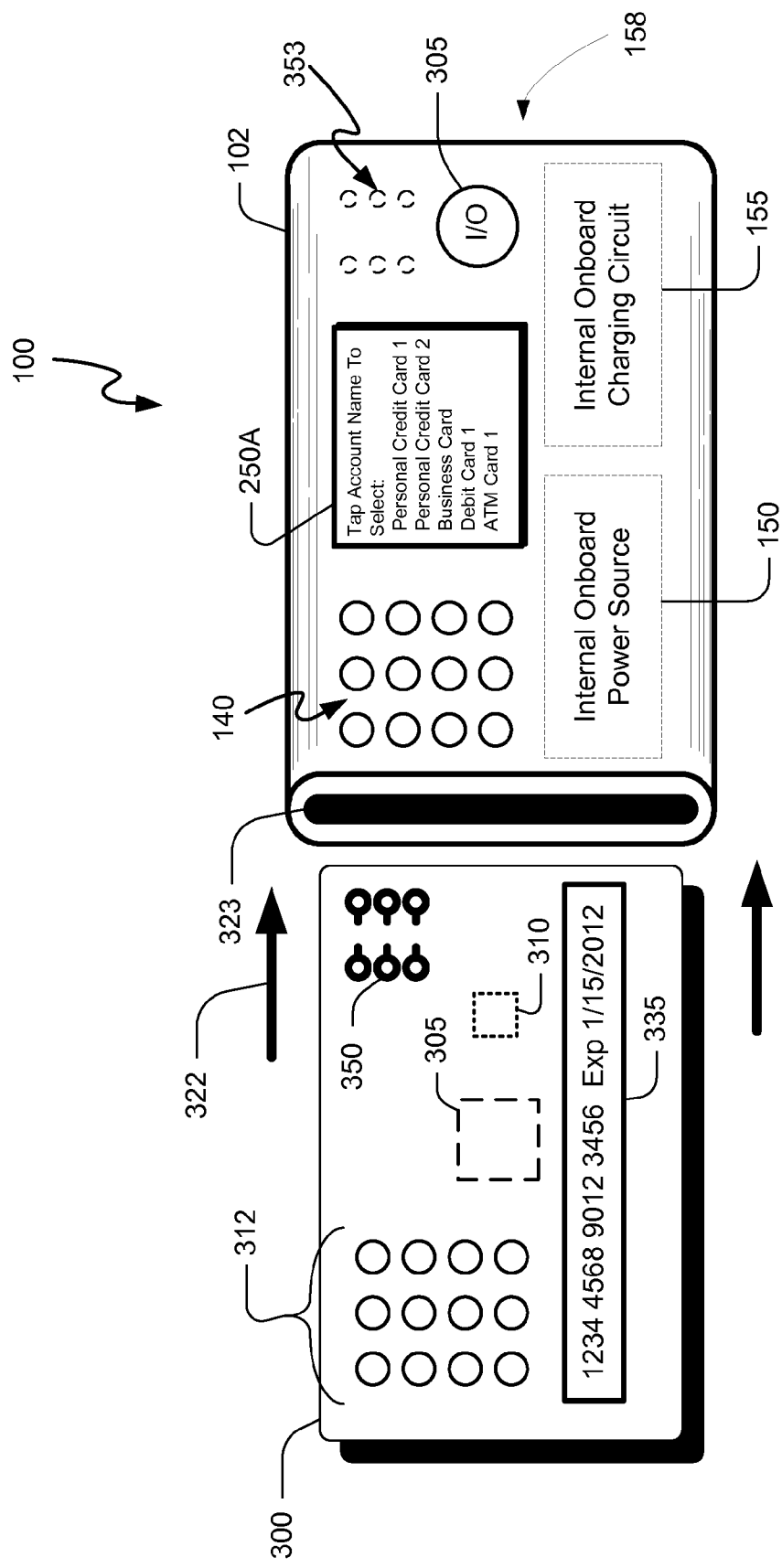
FIG. 3 shows an exemplary implementation of a financial token and an accessory for a financial transaction token.

Turning to FIG. 3, an implementation of the accessory 100 is shown along with one possible financial token embodiment 300. The substrate of the financial token 300, in one implementation, takes the form of a transaction card 300 that is substantially rigid and thin as are conventional credit or debit cards, and possesses substantially similar dimensions as existing credit, debit, stored value, or smart cards. In one implementation, the thickness of card 300 exceeds that of conventional credit, debit, or stored value cards in order to accommodate circuitry, electronics, displays, and/or interface elements. The substrate of the card 300 contains an embedded processor 305 and memory 310.

A front side of the token 300 is shown with an array of buttons 312 and a display 335 for outputting alphanumeric text or graphics, such as an account number and expiration date. An array of physical contacts 350 is shown, which may be utilized in conjunction with a POS terminal, or the electrical/data interface 145. In the illustrated implementation, the token 300 may be placed within the accessory 100 by, for example, but not by way of limitation, sliding the token 300 into 322 a slot 323 defining a cavity within the accessory housing 102. The accessory housing 102 retains the token 300 until the user actuates a hardware mechanism such as a latch (not shown) that retains the token 300 within the cavity within the accessory housing 102. Alternatively, the token 300 could be retained by an electromechanical latch (not shown) coupled to the power source 150 and the integrated processor 105, wherein the token could be released upon an execution of a command by the processor 105. For example, but not by way of limitation, if a user entered a valid authorization code into the touch screen interface 250A, the processor determines the code is valid and provides a command to the electromechanical latch to release the token from the accessory. Alternatively, a drive element (such as those that actuate Compact Disk player disk slots in portable CD players) could eject the card through the slot 323 upon receiving a command to eject the card from the processor 105.

The accessory 100 is shown with a user input mechanism comprising an array of buttons 140, and a touch screen 250A as described in relation to FIG. 2. An external charging interface 158 is provided on a side panel of the housing of the apparatus 102. The touch screen, as with most conventional Portable Digital Assistants (PDAs), both accepts input through strokes or taps and produces output for viewing by the user. Status information and commands may be entered by the user tapping on or dragging on the touch screen 250A.

By way of example but not limitation, the accessory 100 includes, in the illustrated embodiment, an array of electrical contacts 353 comprising at least a portion of the financial token internal interface 145. When the token 300 is fully inserted 322 into the cavity of the accessory housing 102, the contacts 353 proximally engage with the contacts 350 on the token 300, thereby establishing electrical connectivity. As described below other implementations of the internal interface 145 with the token 300 are possible, whereby electrical coupling between the token 300 and the accessory 100 are accomplished using all or partially contactless approaches.

In one implementation, the user turns on the accessory 100 by depressing an on/off button 305, and then produces a stroke on the pad/screen 250A by dragging a fingertip or stylus across the pad or screen area 250A to reproduce a symbol or glyph substantially similar to a symbol pre-programmed into the integrated processor 105 and storage 110 (embedded, not shown). Once the symbol or glyph is entered by the user on the pad/screen 250A, the processor 105 compares its features with a pre-stored graphical implementation and if the symbol's features are within a predetermined range, the accessory 100 is enabled for use, otherwise an invalid entry message is output to display 250A and use is further inhibited until the successful glyph or symbol is entered.

As further explanation of the coupling between the accessory 100 and the token 300, we return to FIG. 1. The accessory 100 includes an internal electrical/data port or interface 145 that is coupled to the integrated processor 105 through the signal bus 120 and to a power signal through power line 119 as described above. Since the signal bus 120 and power line 119 carry potentially bidirectional signals, data and/or power signals may flow into or out of the electrical/data interface 145. In one implementation, a power signal is delivered to and energizes at least part of the coupled financial token 300 through the electrical data interface 145. Using the supplied power, the financial token 300 may operate onboard circuitry to exchange data with the accessory 100, receive commands from the accessory 100, or charge an energy storage element embedded within the financial token 300 from the accessory's power source 150. Through the interface, the integrated processor 105 may also determine a charge state of the energy storage element within the token, and display the status in the user interface 130. Also, memory 310 within the financial token 300 may be queried through commands issued by the bus 120 through the interface 145, and the processor 105 may receive and process the results of the data returned through the interface 145. For example, but not by way of limitation, the processor 105 may request data regarding a financial account from the financial token 300, and the accessory 100 may conduct a transaction using the external interface 137, in lieu of conducting the transaction using only the financial token 300. As another example, but not by way of limitation, the processor 105 may send commands and account data to the financial token 300, configuring the token 300 for use for a particular account as selected through the user interface 130.

The internal port or interface 145 may be coupled to a financial token 300 by any number of electrical coupling techniques, including electrical contacts between the accessory 100 and the financial token, RFID signal transceivers, IrDA signal infrared transceivers, visible light transceivers, invisible light transceivers, magnetic strip read/write heads, modulated laser transceivers, modulated RF communication transceivers, and combinations thereof. Those of skill in the relevant arts appreciate that a combination of coupling techniques may be utilized, such as by providing a data signals through electrical contacts while a power signal is delivered by an electromagnetic field from the accessory 100 to an inductor located within the token 300.

Figure 4:
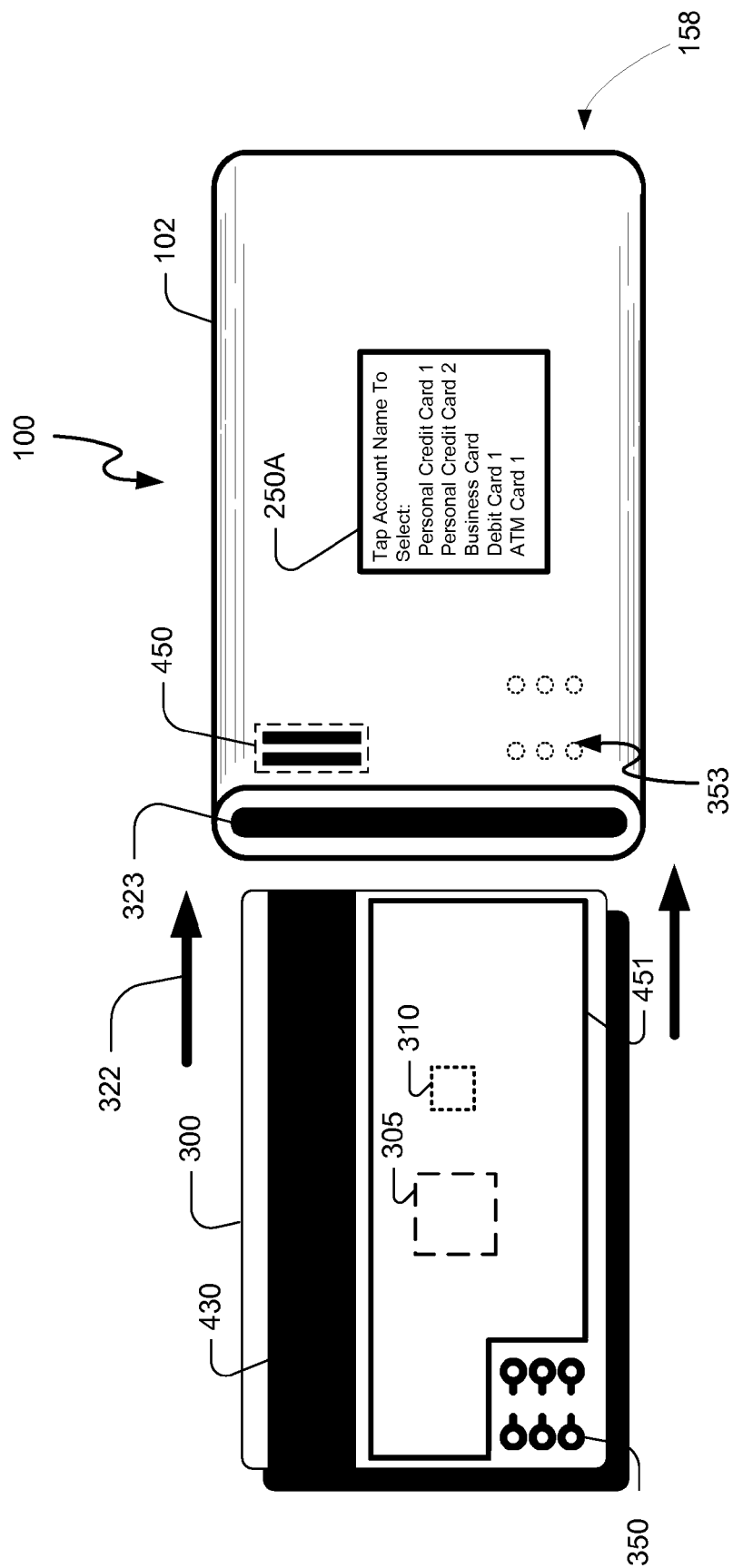
FIG. 4 shows a second exemplary implementation of a financial token and an accessory for a financial transaction token.

Turning to FIG. 4, another implementation of an accessory 100 is shown with a financial token 300. The token 300 has an embedded processor 305, a memory 310, and an energy storage element 451 such as a thin film capacitor electrically coupled to the token's electronic circuitry. The token 300 has a magnetic stripe 430, which like conventional magnetic stripe fields, is readable by preexisting merchant POS terminals or ATMs. The magnetic stripe 330 may optionally be programmable by data and commands sent from the an embedded processor within the token 305 and memory 310.

Similarly to FIG. 3, the token 300 may be placed within the accessory 100 by, for example, but not by way of limitation, sliding 322 the token 300 into a slot 323 defining a cavity within the accessory housing 102. The accessory housing 102 retains the token 300 until the user actuates a hardware mechanism such as a latch (not shown) that retains the token 300 within the cavity within the accessory housing 102. Alternatively, the token 300 could be retained by an electromechanical latch (not shown) coupled to the power source 150 and the integrated processor 105, wherein the token could be released upon an execution of a command by the processor 105. For example, but not by way of limitation, if a user entered a valid authorization code into the touch screen interface 250A, the processor determines the code is valid and provides a command to the electromechanical latch to release the token from the accessory. Alternatively, a drive element (such as those that actuate Compact Disk player disk slots in portable CD players) could eject the card through the slot 323 upon receiving a command to eject the card from the processor 105.

In this implementation, the accessory 100 includes an internal set of electromagnetic read and/or write heads 450 which comprise one possible embodiment of the electrical/data interface 145. As the token 300 is moved 322 into the cavity 323, the heads 450 traverse a significant portion of the length of the magnetic stripe 430 while in proximity to the surface of the magnetic stripe. If the heads 450 are so enabled by the integrated processor 105, data may be read from and/or written to the magnetic stripe 430 during insertion 322 or extraction of the token 300. Such data, as mentioned previously is processed by the integrated processor 105 by transmitting the data to or receiving the data from the data bus 120 which is in turn coupled to the internal interface 145. In one example, but not by way of limitation, the token's magnetic stripe 430 is erased by the read/write heads 430 upon insertion 322 to the accessory 100, and is programmed with account data specified in the user interface 140 upon removal of the token 300 from the accessory.

Also shown on the card 300 is an optional array of physical contacts 350, which, as described above come into proximity with internal electrical contacts 353 when the token 300 is inserted 322 into the cavity 323. The contacts 353 comprise at least a portion of the financial token internal interface 145. When the token 300 is fully inserted 322 into the cavity of the accessory housing 102, the contacts 353 proximally engage with the contacts 350 on the token 300, thereby establishing electrical connectivity. As mentioned previously, other implementations of the internal interface 145 with the token 300 are possible, whereby electrical coupling between the token 300 and the accessory 100 are accomplished using all or partially contactless approaches.

Turning to FIG. 7A, an alternate implementation of the accessory 100 is shown as a communications device such as a cell phone. The accessory housing 102 includes a slot 323 for a financial token 300, or optionally, the financial token 300 is permanently or semi-permanently integrated within the hardware of the accessory 100. The accessory 100 has a display 230, and a data entry keypad 140, allowing interaction with the accessory to issue user commands. As mentioned previously, the accessory 100 may be used to complete a financial transaction without removing token 300, or the accessory 100 may configure the token 300, using commands entered through the user interface 140, to select a particular transaction payment account to be transmitted to the token through the internal electrical interface (not shown). In a similar spirit, FIG. 7B illustrates another implementation of the accessory 100, shown as a consumer device such as a personal digital assistant (PDA). The accessory housing 102 includes a slot 323 for a financial token 300, or optionally, the financial token 300 is permanently or semi-permanently integrated within the hardware of the accessory 100. The accessory 100 has a touch screen display 250A for entry and output of commands and data, a data buttons and pads 140. As mentioned above, the accessory 100 may also be used to complete a financial transaction without removing token 300, or the accessory 100 may configure the token 300, using commands entered through the user interface 140, to select a particular transaction payment account to be transmitted to the token through the internal electrical interface (not shown).

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. An accessory for a financial token, the financial token having an embedded processor, a memory, an energy source, and an electrical interface, the accessory comprising:
   an onboard power source;
   charging circuit means for electrically charging the onboard power source by physical movement of the accessory;
   a mass and a piezoelectric crystal electrically coupled to the charging circuit means, wherein the physical movement of the accessory includes impact of the mass on the piezoelectric crystal, whereby the piezoelectric crystal delivers an electrical current into the onboard power source;
   an integrated processor;
   a user interface;
   a power circuit;
   means for placing the financial token in electrical communication with the power circuit through the electrical interface to charge the energy source; and
   storage, wherein each of the onboard power source, the integrated processor, the user interface, the power circuit, and the storage are in electrical communication with at least one of the others.

2. The accessory as defined in claim 1, wherein the placing means further comprises means for regulating voltage between the electrical interface and the onboard power source.

3. The accessory as defined in claim 1, further comprising electromagnetic read/write heads in substantial proximity to a magnetic stripe on the financial token.

4. The accessory as defined in claim 3, wherein as the financial token is inserted into or removed from the accessory, the read/write heads are translated across substantially all of the length of the magnetic stripe.

5. The accessory as defined in claim 4, wherein as the financial token is inserted into or removed from the accessory, account data is transmitted from the read/write heads to the integrated processor.

6. The accessory as defined in claim 4, wherein as the financial token is inserted into or removed from the accessory, account data is transmitted from the integrated processor to the read/write heads.

7. The accessory as defined in claim 1, wherein the charging circuit means further comprises means for receiving a power signal from an external power source to charge the onboard power source.

8. The accessory as defined in claim 1, wherein the charging circuit means further comprises induction means for receiving a charge current induced through an electromagnetic field to charge the onboard power source.

9. The accessory as defined in claim 1, wherein the charging circuit means further comprises a photovoltaic cell to charge the onboard power source.

10. The accessory as defined in claim 1, wherein the onboard power source comprises a capacitor.

11. The accessory as defined in claim 10, wherein the capacitor is a thin film capacitor.

12. The accessory as defined in claim 1, further comprising a shielding means for providing a function selected from the group consisting of:
    preventing unintended erasure of magnetic media proximal to the token;
    preventing unauthorized access to data stored within the memory in the token;
    preventing unintended use of the financial token; and
    combinations thereof.

13. The accessory as defined in claim 1, further comprising locking means for physically securing the financial token within the accessory.

14. An accessory for a financial token, the financial token having an embedded processor, a memory, an energy source, a power interface, and a data interface, the accessory comprising:
    an onboard power source;
    charging circuit means for electrically charging the onboard power source by physical movement of the accessory;
    a mass and a piezoelectric crystal electrically coupled to the charging circuit means, wherein the physical movement of the accessory includes impact of the mass on the piezoelectric crystal, whereby the piezoelectric crystal delivers an electrical current into the onboard power source;
    an integrated processor;
    a user interface;
    a power circuit;
    a data circuit;
    means for placing the financial token in electrical communication with the accessory wherein:

the power circuit energizes the electrical interface to charge the energy source; and the data circuit communicates data from the integrated processor to the embedded processor through an internal data port; and storage, wherein each of the onboard power source, the integrated processor, the user interface, the power circuit, and the storage are in electrical communication with at least one of the others.

15. The accessory as defined in claim 14 wherein the internal data port further comprises communication means selected from the group consisting of electrical signals, RFID signals, IrDA signals, visible light, invisible light, modulated laser, modulated RF communication signals, and combinations thereof.

16. The accessory as defined in claim 14, wherein the placing means further comprises means for regulating voltage between the electrical interface and the onboard power source.

17. The accessory as defined in claim 14, wherein the placing means further comprises electromagnetic field means for charging the financial token.

18. The accessory as defined in claim 14, further comprising electromagnetic read/write heads in substantial proximity to a magnetic stripe on the financial token.

19. The accessory as defined in claim 18, wherein as the financial token is inserted into or removed from the accessory, the read/write heads are translated across substantially all of the length of the magnetic stripe.

20. The accessory as defined in claim 19, wherein as the financial token is inserted into or removed from the accessory, account data is transmitted from the read/write heads to the integrated processor.

21. The accessory as defined in claim 19, wherein as the financial token is inserted into or removed from the accessory, account data is transmitted from the integrated processor to the read/write heads.

22. The accessory as defined in claim 14, wherein the charging circuit means further comprises means for receiving a power signal from an external power source to charge the onboard power source.

23. The accessory as defined in claim 14, wherein the charging circuit means further comprises induction means for receiving a charge current induced through an electromagnetic field to charge the onboard power source.

24. The accessory as defined in claim 14, wherein the charging circuit means further comprises a photovoltaic cell to charge the onboard power source.

25. The accessory as defined in claim 14, wherein the onboard power source comprises a thin film capacitor.

26. The accessory as defined in claim 14, wherein the user interface further comprises:
means for data input; and
display means, in electrical communication with the integrated processor and the power circuit, for rendering contents of the storage.

27. The accessory as defined in claim 26, wherein the storage includes code executable to perform commands received by the data input means.

28. The accessory as defined in claim 14, wherein the internal data port further comprises an electrical connector bearing a plurality of electrical signals.

29. The accessory as defined in claim 14, wherein the internal data port further comprises a multiplexer in communication with the integrated processor and the financial token.

30. An accessory for a financial token, the financial token having an embedded processor, a memory, an energy source, a power interface, and a data interface, the accessory comprising:
an onboard power source;
charging circuit means for electrically charging the onboard power source by physical movement of the accessory;
a mass and a piezoelectric crystal electrically coupled to the charging circuit means, wherein the physical movement of the accessory includes impact of the mass on the piezoelectric crystal, whereby the piezoelectric crystal delivers an electrical current into the onboard power source;
an integrated processor;
a user interface;
a power circuit;
a data circuit;
an external interface for encoding data including an account for effecting the payment for a transaction wherein the account data regarding the transaction is transmitted by the integrated processor to an external data port;
means for placing the financial token in electrical communication with the power circuit through the electrical interface to charge the energy source; and
storage, wherein each of the onboard power source, the integrated processor, the user interface, the power circuit, and the storage are in electrical communication with at least one of the others.

31. The accessory as defined in claim 30, wherein the external data port comprises output means selected from the group consisting of:
a magnetic region for said encoded data;
an electrical connector;
an antenna configured to operate with a POS terminal;
an infrared transceiver;
a display for a rendering of the encoded data; and
combinations thereof.

32. The accessory as defined in claim 31 wherein the output means further comprises communication means selected from the group consisting of electrical signals, RFID signals, IrDA signals, visible light, invisible light, modulated laser, modulated RF communication signals, and combinations thereof.

33. The accessory as defined in claim 31, wherein the rendered encoded data includes a scannable graphical indicia.

34. The accessory as defined in claim 31, wherein the rendered encoded data includes a scannable graphical indicia.

35. The accessory as defined in claim 31, wherein the electrical connector comprises a connector selected from the group consisting of a USB connector, an IEEE 1394 connector, an RS232 serial connector, a PCMCIA connector, a parallel PC port connector, a keyboard wedge reader, and combinations thereof.

36. The accessory as defined in claim 30, wherein the placing means further comprises means for regulating voltage between the electrical interface and the onboard power source.

37. The accessory as defined in claim 30, wherein the placing means further comprises electromagnetic field means for charging the financial token.

38. The accessory as defined in claim 30, wherein the charging circuit means further comprises means for receiving a power signal from an external power source to charge the onboard power source.

39. The accessory as defined in claim 30, wherein the charging circuit means further comprises induction means for receiving a charge current induced through an electromagnetic field to charge the onboard power source.

40. The accessory as defined in claim 30, wherein the charging circuit means further comprises a photovoltaic cell to charge the onboard power source.

41. The accessory as defined in claim 30, wherein the onboard power source comprises a thin film capacitor.

42. The accessory as defined in claim 30, wherein the user interface further comprises:
  means for data input; and
  display means, in electrical communication with the integrated processor and the power circuit, for rendering contents of the storage.

43. The accessory as defined in claim 30, wherein the storage includes code executable to perform commands received by the data input means.

44. An accessory for a financial token, the financial token having an embedded processor, a memory, an energy source, and an electrical interface, the accessory comprising:
  an onboard power source;
  an integrated processor;
  a power circuit that includes means for receiving a charge status signal from the financial token;
  storage;
  a user interface that includes:
    means for data input; and
    display means, in electrical communication with the integrated processor and the power circuit, for rendering contents of the storage;
  and
  means for placing the financial token in electrical communication with the power circuit through the electrical interface to charge the energy source, wherein:
    each of the onboard power source, the integrated processor, the user interface, the power circuit, and the storage are in electrical communication with at least one of the others; and
    the storage includes code which, when executed by the integrated processor, the integrated processor:
      derives a charge state of the energy source within the financial token from the received charge status signal; and
      perform commands received by the data input means.

45. The accessory as defined in claim 44, wherein the executable code in the storage further comprises code to perform one or more functions selected from the group consisting of turning the accessory on;
  turning the accessory off;
  instructing the financial token to assume an inactive state;
  instructing the financial token to assume an active state;
  displaying the charge status of the energy storage within the financial token;
  selecting a financial account for use in a transaction;
  initiating a financial transaction using data provided by the financial token;
  configuring the financial token for use with a particular account;
  playing a stored music file;
  playing a stored video file;
  requesting a security indicia;
  comparing the security indicia to a predetermined security indicia;
  erasing at least part of the memory on the financial token;
  securing the financial token from unauthorized use;
  reading a financial account indicia from the financial token;
  transmitting access information to the financial token; and
  combinations thereof.

46. The accessory as defined in claim 44, wherein the storage includes executable code for causing a control signal to be communicated to the financial token through the electrical communication means, whereupon the memory in the financial token is erased upon the accessory communicating the control signal thereto.

47. The accessory as defined in claim 44, wherein the storage includes executable code for causing a control signal to be communicated to the financial token through the electrical communication means, whereupon the embedded processor within the financial token assumes an inactive state upon the accessory communicating the control signal thereto.

48. The accessory as defined in claim 44, wherein the storage includes encrypted data regarding a financial account in a payment system.

49. The accessory as defined in claim 48, wherein the storage includes executable code whereby the integrated processor is configured to:
  request entry of an access indicia through the user interface;
  compare the entered access indicia to a reference indicia pre-stored within the storage; and
  determine that the entered indicia's features are within a predetermined range when compared to the reference indicia, and thereupon, decrypt the encrypted data.

50. The accessory as defined in claim 44, wherein the integrated processor, by execution of code in the storage, authorizes use of the accessory upon occurrence of a condition selected from group consisting of:
  (a) dragging an object on a surface of an area on the accessory sensitive to pressure-related inputs to produce a representation of a symbol or glyph, and comparing the entered representation with a second representation pre-stored in the storage to determine that the entered symbol's features are within a predetermined range when compared to the second representation;
  (b) entering a passphrase by the input means, and comparing the entered passphrase with a second passphrase pre-stored in the storage to determine that the entered passphrase is within a predetermined range when compared to a the second passphrase;
  (c) measuring a biometric aspect of a user and comparing the measured biometric aspect with a pre-stored biometric representation to determine that the measured aspect is within a predetermined range when compared to a biometric representation pre-stored in the storage;
  (d) the financial token is used to complete a transaction with a predetermined trusted merchant, the merchant's identifying information having been pre-stored in the storage; and
  (e) combinations thereof.

* * * * *